United States Patent [19]
Hurditch

[11] Patent Number: 5,817,388
[45] Date of Patent: Oct. 6, 1998

[54] MULTI-COMPONENT DYE COMPOSITIONS FOR OPTICAL RECORDING MEDIA

[75] Inventor: Rodney Hurditch, Providence, R.I.

[73] Assignee: Carl M. Rodia & Associates, Trumbull, Conn.

[21] Appl. No.: 746,449

[22] Filed: Nov. 8, 1996

[51] Int. Cl.$^6$ ..................................................... B32B 3/00
[52] U.S. Cl. ................. 428/64.1; 428/64.2; 428/64.4; 428/64.8; 428/913; 430/270.15; 430/270.16; 430/270.17; 430/270.19; 430/945; 369/283; 369/288
[58] Field of Search ................... 428/64.1, 64.2, 428/64.4, 64.8, 913; 430/270.14, 270.15, 270.16, 270.17, 270.19, 945; 369/283, 288

[56] References Cited

U.S. PATENT DOCUMENTS

| | | | |
|---|---|---|---|
| 4,923,390 | 5/1990 | Oguchi et al. | 430/270 |
| 4,944,981 | 7/1990 | Oguchi et al. | |
| 4,990,388 | 2/1991 | Hamada et al. | |
| 4,999,281 | 3/1991 | Inagaki et al. | |
| 5,024,917 | 6/1991 | Mihara et al. | 430/271 |
| 5,080,946 | 1/1992 | Takagisi et al. | |
| 5,161,150 | 11/1992 | Namba et al. | |
| 5,275,925 | 1/1994 | Mihara et al. | 430/945 |
| 5,316,814 | 5/1994 | Sawada et al. | |
| 5,326,679 | 7/1994 | Yanagisawa et al. | |
| 5,328,741 | 7/1994 | Yanagisawa et al. | |
| 5,328,802 | 7/1994 | Yanagisawa et al. | |
| 5,336,584 | 8/1994 | Yanagisawa et al. | |
| 5,415,914 | 5/1995 | Arioka et al. | |

FOREIGN PATENT DOCUMENTS 353 393 B1  4/1989  European Pat. Off.

OTHER PUBLICATIONS

K. Namba and M. Shinkai, "Development of Lightfast Cyanine Dyes for Recordable CD"; 1993 Proceedings of International Dye Chemistry Conference, pp. 706–713.

K. Namba, "Application of Functional Dyes to Optical Memory Disks"; 1993 Proceedings of International Dye Chemistry Conference, pp. 349–356.

F. Matsui et al., "An Optical Recording Disk Using an Organic Dye Medium in Regard to Provide Interchangeability to the Disks Using Different Organic Dyes"; IEEE Translation Journal on Magnetic Recording, Japan, Feb. 23, 1988, pp. 789–798.

E. Hamada et al., "CD–compatible write–once disc with high reflectivity"; S.P.I.E. vol. 1078 Optical Data Storage Topical Meeting (1989), pp. 80–87.

*Primary Examiner*—Elizabeth Evans
*Attorney, Agent, or Firm*—Wiggin & Dana; William A. Simons

[57] ABSTRACT

The present invention is directed to a dye composition for use in CD-R recording media and having reduced wavelength dependence of the dye layer absorption, comprising:

(1) a first cyanine dye having a peak absorption wavelength in the solid film form in the range of about 690 nm to about 730 nm, the amount of said first cyanine dye is about 90% to about 30% by weight, based on the total weight of the solid components in said dye composition; and (2) at least one noncyanine dye having a peak absorption wavelength in the range of about 900 nm to about 1200 nm, each noncyanine dye having an absorption coefficient greater than 30,000 cm$^{-1}$ and said amount of noncyanine dye is about 10% to about 40% by weight, based on the total weight of the solid components in said dye composition. The invention is also directed to a recordable medium coated with the above dye composition, and a recording mechanism implementing the above dye composition.

19 Claims, No Drawings

MULTI-COMPONENT DYE COMPOSITIONS FOR OPTICAL RECORDING MEDIA

BACKGROUND OF THE INVENTION

1. Field of the Invention

The present invention concerns recording layer compositions for use in CD-recordable (CD-R) optical media, and more particularly a multi-component recording layer composition for use in CD-R optical media that has reduced wavelength dependence of the dye layer absorption. The present invention also concerns a substrate coated with the multi-component recording layer composition, as well as a recording system implementing the multi-component recording layer composition on a recordable medium.

2. Brief Description of Art

Read-Only Memory (ROM) type recording media have been implemented in a variety of fields such as audio recording and information processing. ROM type recording media contain previously recorded information and generally comprise prepits molded into a plastic substrate, a reflective layer comprising a metal such as gold, silver, copper, or aluminum, and a protective layer. ROM recording media are generally offered in the form of compact discs (CDs) which are available for use in audio or computer CD players. However, one drawback to this technology is that these types of recording media have no writable recording layer. This drawback has limited the usefulness of optical storage media.

A strong interest in the development of writable optical recording media has led to two main technologies in the optical recording media art. In the so-called "Write Once Read Many" (WORM) recording media, information is recorded in the form of a pit "burned in" by an incident laser beam. Transient temperatures of >1000° C. cause ablation of the recording film and form the resulting pit. Reproduction of the information stored on the disc is accomplished by irradiating the disc with a laser beam having a weaker output than that for recording. The contrast between the pitted areas and the nonpitted areas on the disc are read as electrical signals.

CD-Recordable (CD-R) media have also been implemented as an alternative to the WORM technology. CD-R technology utilizes a layer of organic dye positioned between a substrate and a reflective layer. In CD-R, the transient temperature rise resulting from absorption of radiation by the incident laser beam is less than that of WORM technology (typically 200°–300° C.). Moreover, the resulting dye decomposition in combination with thermal diffusion causes local changes in the optical properties that are necessary for achieving adequate signal-to-noise ratio (SNR).

The critical distinguishing features of CD-R versus WORM are (1) the presence of a reflective layer in CD-R forming an optical interface with the recording layer, (2) the use of a recording medium in CD-R which has a relatively low absorption at the recording/replay wavelength necessary to attain the high (65–70%) reflectivity after the read beam has passed (twice) through the layer, and (3) a different recording mechanism. In addition, CD-R recording uses light for writing and reading that is always substrate incident and is reflected back through the substrate to the detector. In WORM the light may be incident on the recording layer.

The organic dyes used in CD-R applications generally include classes of compounds in which the absorption characteristics may be manipulated to achieve the best overall combination of functional characteristics, such as write sensitivity, read stability, solubility in coating solvent, shelf life, and other properties known to those skilled in the art. The organic dyes used in CD-R also offer low thermal conductivity which results in low heat loss and higher writing sensitivity (reduced laser power) compared with other highly absorbing materials such as metal films. Preferred classes of organic dyes used in many CD-R applications are the cyanine dyes, particularly indodicarbocyanines (hereinafter referred to as INCY), benzindodicarbocyanines (hereinafter referred to as BINCY) and the hybrid indodicarbocyanine-benzindodicarbocyanines (hereinafter referred to as INCY-BINCY). Structures of particular examples of each of these classes of organic dyes are shown in formulae (I) to (III), respectively:

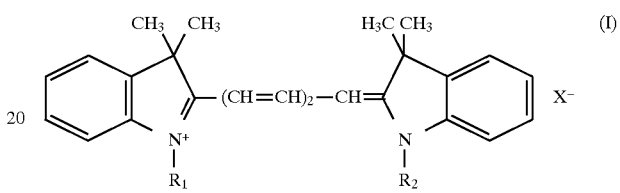

wherein X⁻ is an anion and $R_1$ and $R_2$ are propyl;

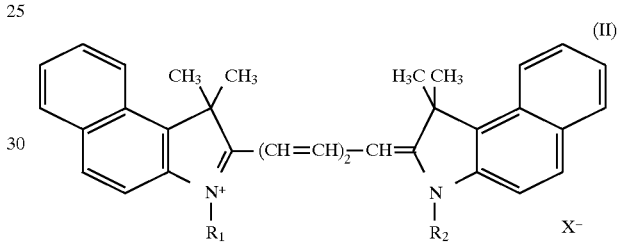

wherein X⁻ is an anion and $R_1$ and $R_2$ are butyl;

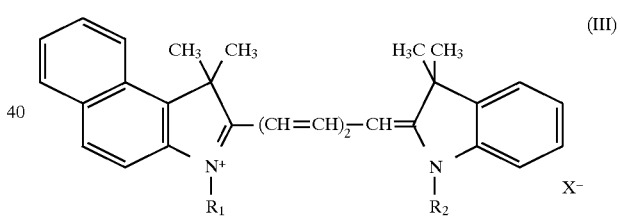

wherein X⁻ is an anion and $R_1$ is butyl and $R_2$ is propyl.

The advantages of these classes of dyes in CD-R applications are (1) relative ease of synthesis; (2) high refractive index in the solid film state; and (3) acceptable thermal and photochemical stability, especially when compared with other classes of cyanine dyes. The above classes of cyanine dyes exhibit desirable characteristics in the form of cation-anion salts in which the anion (X⁻) may be a halide (preferably iodide), a perchlorate, a sulfonate, a tosylate, boron tetrafluoride, and the like. As shown in the above formulae, a pentamethine group joins the indol or benzindol moieties. The wavelength region of maximum light absorption in any particular dye (or the intensity of absorption at a given wavelength) depends critically on the length of the methine chain.

The majority of patents related to the organic dyes used in CD-R are directed to dye compositions having certain improvements with regard to (1) solubility in coating solvents such as cellosolve, cellosolve acetate, methylcarbitol, diacetone alcohol, or mixtures thereof, with alcohols such as amyl alcohol, heptanol or cyclohexanol; (2) stability against thermal oxidization and photooxidation; (3) reduced dependence of the recording characteristics on wavelength of the laser light (especially in the range 775–830 nm which characterizes the range of wavelengths emitted from GaAs lasers under typical operating conditions); (4) higher recording sensitivity; and (5) higher recording and read-out stability. Typical past improvements include combinations of one or more dyes with stabilizers, often referred to as quenchers. Particularly suitable quenchers which reduce photooxidation have generally been based on transition metal tetrathiolate complexes (preferably nickel tetrathiolate complexes) which are optionally combined with an amine.

Also in the past, dye molecules have been modified to improve solubility in spin-coating solvents such as ethyl cellosolve acetate and diacetone alcohol. This modification has been accomplished by substitution of a moderately hydrophobic alkyl group, such as propyl or butyl, onto the indole nitrogen atom.

A number of patents disclose using more than one cyanine dye component, each having different absorption characteristics to reduce the wavelength dependence of the absorption in the critical region of the recording of a recordable compact disc. However, such previous attempts to change the absorption characteristics of the dyes have been based on the combination of two cyanine dyes having absorption peaks at wavelengths lower than the critical wavelength of 775 nm which results in a relatively minor improvement in wavelength dependence. For example, U.S. Pat. No. 5,328,741 assigned to Pioneer Electronic Corp. discloses a mixture of two cyanine dyes having a specific range of concentration. In one embodiment, the dyes are a mixture of an INCY-type dye and a BINCY-type dye. The patent further teaches these specific dyes are readily soluble in a good coating solvent such as diacetone alcohol (DAA). This patent also discloses the use of a specific metal quencher.

U.S. Pat. No. 5,336,584 assigned to Pioneer Electronic Corp. discloses a composition containing BINCY-type dye and a nickel tetrathiolate quencher.

U.S. Pat. No. 5,328,802, assigned to Pioneer Electronic Corp., discloses a particular BINCY-type dye in combination with a nickel tetrathiolate quencher.

U.S. Pat. No. 5,161,150 assigned to TDK Corp. discloses the use of a dye mixture comprised of different pentamethine and heptamethine indo or benzindo cyanines.

U.S. Pat. No. 5,316,184 assigned to Fuji Photo Film discloses use of diacetone alcohol (DAA) as a coating solvent.

Moreover, solutions containing symmetrical dyes (such as INCY or BINCY), particularly in combination with nickel tetrathiolate quenchers, in sufficiently high concentrations needed to achieve desirable coating characteristics, may suffer from poor shelf life and particle generation. These problems occur because these dyes form very stable crystals, especially in a solvent such as DAA and in the presence of relatively large concentrations of the amine and nickel bis(dithiolate) quenchers required to achieve desirable photostability and recording sensitivity.

One advantage of the present invention over prior art CD-R dyes is the significant reduction in the amount by which absorption of the recording light in the dye layer decreases with changes in the wavelength of the laser light (which results from temperature and power fluctuations as well as differences in the laser design parameters). This advantage is achieved by a combination of certain compatible and stable organic non-cyanine dyes with certain classes of cyanine dyes. The stable non-cyanine dyes have relatively high absorption coefficients (typically greater than 30,000 $cm^{-1}$) with absorption peaks in the range of 900–1200 nm, and relatively wide absorption bands. These spectral characteristics contribute increasing absorbance with increasing wavelength in the critical recording range of wavelengths. These absorption characteristics counteract the decreasing absorbance characteristic of cyanine dyes, thus producing a recording layer with specific absorption, stability and solubility parameters suitable to meet CD-R recording standards.

A second advantage of the present invention is improved photostability of the dyes. This advantage results from the use of specific stable dye combinations in which overlap of the absorption bands occurs sufficiently at the recording wavelength to facilitate transfer of energy from the cyanine dye to the non-cyanine dye. This energy transfer process (often referred to as excited state quenching) is a well known mechanism for the photostabilization of organic materials such as dyes. Furthermore, this improved photostability enhances the recording latitude of the dye layer, such that response to the multiple exposures of the reproduction light does not result in any significant photodegradation.

An additional advantage of the present invention is the improved sensitivity for recording which is accompanied by a wider recording latitude, such that the small variations in the parameters which control the recording process such as dye layer film thickness, uniformity of the coating, and substrate optical properties have much less impact on recordabilty of the disc.

In the case where an asymmetrical cyanine dye (i.e., INCY-BINCY) is used as a major component of the dye solution, an additional benefit is the improved stability of the dye solutions. As used herein, an asymmetrical cyanine dye is a cyanine dye in which the ring structures joined by the methine bridge are not the same. In addition, the non-cyanine dyes of the present invention exhibit excellent solubility in preferred coating solvents such as DAA.

BRIEF SUMMARY OF THE INVENTION

Accordingly, one aspect of the present invention is directed to a dye composition for use in CD-R recording media and having reduced wavelength dependence of the dye layer absorption, comprising:

(1) a first cyanine dye having a peak absorption wavelength in the solid film form in the range of about 690 nm to about 730 nm, the amount of the first cyanine dye is about 90% to about 30% by weight, based on the total weight of the solid components in the dye composition; and (2) at least one organic noncyanine dye having a peak absorption wavelength in the range of about 900 nm to about 1200 nm, each organic noncyanine dye having an absorption coefficient greater than 30,000 $cm^{-1}$ and the amount of the organic noncyanine dye is about 10% to about 40% by weight, based on the total weight of the solid components in the dye composition. As used herein, "peak absorption wavelength" is defined as the highest absorption wavelength at which the absorption of film achieves its maximum value.

Another aspect of the invention is directed to a recordable medium comprising (a) a protective layer; (b) a reflective layer in proximity to the protective layer; (c) a recording layer in proximity to the reflective layer and forming an optical interface with the reflective layer, the recording layer comprising the above-noted dye composition; and (d) a transparent substrate on which the recording layer is formed.

Yet another aspect of the present invention is directed to a recording system utilizing the above recordable medium.

DETAILED DESCRIPTION OF PREFERRED EMBODIMENTS OF THE PRESENT INVENTION

The present invention is a multi-component CD-R dye composition that is based on the above-noted combination of two classes of dyes. The optical recording medium of the invention is an optical recording disc having this particular mixture of dyes as a recording layer and a reflective layer deposited thereon. The optical recording disc is capable of reproduction in accordance with the CD-Standard as set forth in Philips Sony Orange Book (*CD-R Standards version 2.0*, published by Philips Consumer Electronics BV, November, 1994).

The preferred substrate for the dye-containing recording layer is formed from a resin material (i.e., compression molded polycarbonate) which is substantially transparent to 770 to 830 nm light produced by a semiconductor laser. A spiral tracking groove (often referred to as the pregroove) is formed on the surface of the substrate where the recording layer is formed during the molding process. Typically the groove has a depth of 100–250 nm and a width of 0.3 to 1 $\mu$m. Adjacent groove tracks are separated by a land portion and the combined width of land and groove (defined as the pitch) is typically about 1.6 $\mu$m.

The recording layer is applied on the grooved substrate using the above-noted mixture of compatible cyanine and non-cyanine dyes such that the absorption of the dye combination does not vary substantially over the range of recording wavelength from 775–830 nm, and especially in the narrower range from 775–795 nm.

One preferred dye mixture comprises a cyanine dye (Dye A) and an organic non-cyanine dye (Dye B). Dye A is selected from the cyanine dyes shown in Formulae II and III as described above and in Table 1 wherein the anion ($X^-$) is selected from $ClO_4^-$, $IO_3^-$ and $I^-$, and wherein $R_2$ and $R_3$ are individually selected from propyl (e.g., n-propyl or isopropyl) or butyl (e.g., n-butyl or isobutyl) and having a maximum wavelength of absorption typically in the range from 690–730 nm, more preferably from 695–715 nm. Dye B is an organic non-cyanine dye selected from those shown in Formulae (IV) and (V) below and as described in Table 1 as having a maximum wavelength of absorption typically in the range from 900–1200 nm and preferably from 950–1175 nm and having the following formulae:

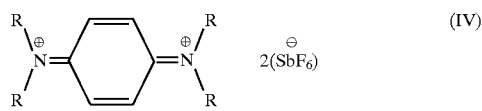

where

R=

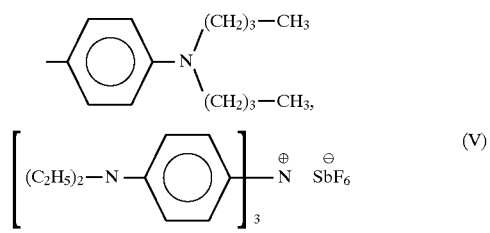

Preferably Dye A is present in amount of from about 90–30% by weight of total solid components, preferably in an amount of 85–60% by weight. Preferably, Dye B has an absorption coefficient greater than 30,000 $cm^{-1}$ and is present in amount of about 10–40% by weight of total solid components, preferably in an amount of 10–35% by weight. Dye B may also comprise a mixture of two organic non-cyanine dyes selected from those shown in Formulae (IV) and (V) having the same preferred ranges of maximum absorption wavelength and absorption coefficients and is present in an amount such that the total of both dyes does not exceed 10–40% by weight of the solid components in the dye composition. The term "organic" as used in conjunction with the term "non-cyanine dye" refers to dyes that do not contain a metal cation such as nickel. Thus, organic non-cyanine dyes as used herein do not include metal-containing stabilizers or quenchers.

The absorption coefficient is defined as the attenuation of absorption of a thin film measured by the log of the ratio of the incident to the transmitted intensity of light at a wavelength corresponding to the absorption maximum, impinging on a thin film of typically 100 nm to 1000 nm thickness and expressed in units of reciprocal cm ($cm^{-1}$).

In other alternative preferred embodiments, a third dye (Dye C as shown in Formulae (I) above) having a lower absorption maximum than Dye A in the recording range of wavelengths may be added to optimize the absorption of the dye mixture to achieve the desired recording properties for a given substrate pregroove depth and film thickness, which is found to provide the widest process window and yield in manufacturing. Dye C is preferably a cyanine dye of formula I above wherein $X^-$ is either perchlorate ($ClO_4^-$), $IO_3^-$, or $I^-$ and $R_1$ and $R_2$ are propyl, and has a peak absorption wavelength in the solid film form of from about 660 nm to 700 nm, and, if used, is preferably present in amount of about 5–55% by weight of total solid components, more preferably in an amount of about 5–25%.

A nickel stabilizer may be added to the light absorbing dye mixture to enhance the stability of the recording medium to heat, moisture and light. A multifunctional nickel stabilizer is capable of acting as a singlet oxygen quencher as well as a deactivator of peroxy, hydroperoxy or alkoxy radicals. Nickel complexes such as bis(dithiol), thiocatechol, thiobisphenolate or dithiol types are preferred classes of quenchers. One particularly preferred quencher is nickel dibutyl dithiocarbamate shown in Formula VI.

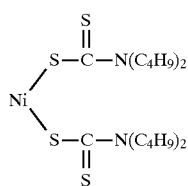

(VI)

If used, the nickel stabilizer may be added in an amount of about 1 to 25% by weight, and preferably 5–15%.

The following Table 1 describes the absorbance characteristics of the above-described dyes or stabilizers.

TABLE 1

| Dye or Stabilizer | | | Solution Absorbance | | Film Absorbance | |
|---|---|---|---|---|---|---|
| Mol structure ref. No. | Type | Anion | Lambda max (nm) | Extinction Coefficient (lgm$^{-1}$) | Lambda max (nm) | Absorption Coefficient (cm$^{-1}$) |
| I | Cyanine | iodide | 650 | 427 | 675 | 120000 |
| II | Cyanine | perchlorate | 690 | 327 | 715 | 130000 |
| IIIA | Cyanine | perchlorate | 665 | 367 | 700 | 140000 |
| IIIB | Cyanine | iodate | 665 | 350 | 700 | 150000 |
| IV | di-imonium | SbF$_6$ | 1100 | 79 | 1150 | 65000 |
| V | Aminium | SbF$_6$ | 970 | 53 | 1020 | 42000 |
| VI | Ni dibutyldithiocarbamate | | 365 | | | |

The recording layer has an index of refraction n (the real part of the complex index of refraction) of about 2 to 3 at the wavelength of the recording and reading light. A high value of n is required to provide adequate signal modulation on recording, and results from the combination of the high absorption coefficients and broad absorption bands of the selected dyes in the wavelength regions defined above, and the compatibility of the dye components of the mixture in the solid film form.

The recording layer is formed by dissolving the dye mixture together with any additional nickel stabilizer in a coating solvent at a concentration in the range 2–10% by weight of the total solid components in the solution. Prior to application in the spin coater, the solution is filtered through an inert filter material such as TEFLON (tetrafluoroethylene polymer) with a pore size of about 0.2 μm to remove particulate matter which might otherwise result in coating defects. The dyes and other components of the mixture must be sufficiently purified so that impurities having poor solubility in the coating solvent do not precipitate as the solvent is removed during the coating process. Suitable solvents or solvent mixtures must not dissolve the substrate material and yet have good solvency for the dye components. Suitable solvents usually have a balance between polarity and hydrogen bonding activity, having either keto, alkoxy, hydroxy, ether or ester functionality, and may combine more than one function or may be a mixture of two or more solvents.

Typical solvents for use with the dye mixtures of the present invention comprise diacetone alcohol, cellosolve acetate, ethyl lactate, and tetrafluoropropanol which may be used singly or in combination. Additional cosolvents which may be added to the above solvents to improve the spin coating characteristics and/or further modify the solvency characteristics include hexanol, butanol, cyclohexanol, isoamyl alcohol, butyl lactate, butyl acetate, ethyl-3-ethoxypropionate, and propylene glycol monomethyl ether. Other examples of solvents which can be blended with the above solvents to achieve a desirable balance of solubility and coating characteristics include cyclohexanone, amyl acetate, methyl amyl ketone, anisole and propylene glycol monomethyl ether acetate.

As minor components, polymer binders such as polyalkylacrylates, polyvinylacetates, polyamides, polyvinylcarbazoles or polycarbonates may be added to increase solution viscosity or improve film forming characteristics. Surfactants or leveling agents may also be added to improve coating uniformity.

Preferably the recording layer thus formed has a film thickness of about 100 to 300 nm, although the exact thickness is chosen by those skilled in the art to correspond to a range in which the reflectivity is relatively high so that the CD-R specifications of the Philips Sony Orange Book may be achieved. Reflectivity exhibits strong nonlinear dependence on the film thickness due to the thin film interference effect, and depends also on the substrate pregroove dimensions due to the optical phase difference between the land and the groove.

After spin coating, the dye layer may be optionally dried to further remove residual solvent and improve uniformity of the recording characteristics.

A metallic reflective layer is deposited on the dye layer which may comprise one or more metals having high reflectivity in the range of the recording and reproduction wavelengths from 770–830 nm and having acceptable stability to heat, moisture, light, and oxygen. Metals or alloys may be selected from the group consisting of aluminum, platinum, copper, silver or gold. In the case of alloys, high reflectivity is available in which silver or gold is present in an amount of at least 60%. Gold is often preferred because of its high chemical stability and reflectivity.

The metallic layer is formed typically by sputtering or other method known in the art. The thickness is preferably in the range 30–100 nm depending on the metal deposited.

A protective coat is formed on the surface of the metallic reflective layer and comprises a radiation curable resin, preferably of the UV curable type, which can be deposited as a liquid. The protective coat is formed by spin coating to produce a uniform layer of about 1 to 15 μm, preferably in the range 3–10 μm. Examples of radiation curable resins are monomers, oligomers, and polymers having di- or trifunctional groups capable of crosslinking on exposure to radiation. Suitable compositions include acryl functionalized monomers such as ethylacrylate, ethylene or diethylene glycol acrylates, hexane glycol arylates and methacrylates of pentaerythritol and trimethylpropane, and acryl modified elastomers of urethanes as well as other oligoester acrylates, caprolactones and modified urethanes incorporating functional groups such as carboxylic acid. Radiation curable resins based on modified thermoplastics having a UV curable functional group attached to the polymer chain including acrylate, allyl, vinyl or maleic groups may also be used. Examples of the thermoplastic resins include polyesters, polyamides, and polyimides. For UV curing, photopolymerization initiators or sensitizers are added to the radiation curable compositions.

The UV curable resin is designed to provide fast UV curability, low shrinkage, sufficient hardness and chemical resistance, especially to components used in the formulation of screen printing inks used to form a label on the protective layer.

Recording may be carried out on the optical recording medium using a variety of equipment designed to meet the specifications given in Sony-Philips Orange Book. In such equipment a beam of recording light having a wavelength of 780 nm for example is focused in the pregroove through the back of the substrate to form a recorded spot having a lower reflectivity than the surrounding unexposed region. The spot is detected in the reproduction process by means of a lower power laser beam which is reflected by the reflective layer through the substrate to a photodetector. During recording and reproduction, the substrate (disc) is rotated at a tangential velocity of 1.2 meters per sec or higher. The recording mechanism is described in the background to this invention.

The present invention is further described in detail by means of the following Examples. All parts and percentages are by weight and all temperatures are in degrees Celsius, unless explicitly stated otherwise.

EXAMPLES

Example 1

A compound of formula (IIIA) as explained in Table 1 wherein $R_1$ is $C_4H_9$ and $R_2$ is $C_3H_7$ and $X^-$ is $ClO_4^-$ was used as the first cyanine dye, and a compound of formula (IV) as explained in Table 1 was used as the non-cyanine dye.

These cyanine and non-cyanine dyes were dissolved in diacetone alcohol at a weight percentage of 80% of formula (IIIA) dye and 20% of formula (IV) dye. The total weight of solids in the solution was 6.5 wt %. The resulting solution was filtered through a 0.2 $\mu$m TEFLON filter and coated using a STEAG spin-coater onto a polycarbonate substrate (120 mm in diameter and 1.2 mm thickness produced with a spiral pregroove by injection molding to form a light absorbing dye-layer having a thickness of 150 mm). The dye layer was dried by placing the coated polycarbonate disc in a convection oven at 50° C. for 20 minutes.

Example 2

The procedure of Example 1 was repeated except that the amount of Dye IIIA was 75% and the amount of the Dye IV was 25%.

Example 3

The procedure of Example 1 was repeated except that Dye V as explained in Table 1 was used in place of Dye IV in an amount of 20%.

Example 4

The procedure of Example 1 was repeated except that both Dye IV and Dye V were present in amount of 10% each.

Example 5

The procedure of Example 1 was repeated except that Dye V was present in an amount of 10% and a nickel stabilizer of Formula VI as explained in Table 1 was present in an amount of 10%.

Example 6

The procedure of Example 1 was repeated except that Dye IV was present in an amount of 10% and a nickel stabilizer of Formula VI was present in an amount of 10%.

Example 7

The procedure of Example 1 was repeated except that Dye IIIA was present in an amount of 65% and Dye V in an amount of 35%.

Example 8

The procedure of Example 1 was repeated except that the Dye IIIA was present in an amount of 60%, and Dye I as explained in Table 1 was additionally present in an amount of 20%.

Example 9

The procedure of Example 1 was repeated except that the Dye IIIA was replaced by Dye II in an amount of 40% and Dye I was present in an amount of 40%.

Example 10

The procedure of Example 1 was repeated except that the Dye IIIA was present in an amount of 90%, and Dye IV in an amount of 10%.

Example 11

The procedure of Example 1 was repeated except that Dye IIIB as explained in Table 1 was present in an amount of 90% and Dye IV was present in an amount of 10%.

Comparative Example 1

The procedure of Example 1 was repeated except that Dye IIIA only was present in an amount of 100%.

Comparative Example 2

The procedure of Example 1 was repeated except that Dye II was present in an amount of 65% and Dye I in an amount of 35%.

The results of all the measurements carried out as described in Example 1 are shown in Tables 2 and 3. Examples 1 through 11 containing an amount of Dye B from 10–35% show a significant reduction in the percentage change of absorbance with wavelength over the ranges 775–790 nm, 800–830 nm and 775–830 nm in comparison with the comparative Examples 1 and 2 in which Dye B is not present.

The improvement is greatest for those samples having Dye IIIA or IIIB present in an amount greater than 60% and Dye IV or Dye V, both individually present or in combination in a total amount greater than 10% as shown in Examples 1 through 8, as well as in Example 11.

Furthermore, Examples 1 through 11 show excellent photostability as shown by the relatively small amount of absorbance changes resulting from 48 hr. exposure to fluorescent radiation having an intensity of about 10000 lux and a high spectral output in the main absorption band of the cyanine dye.

In addition to those improvements described in the forgoing, the recording sensitivity as measured by the laser power required for optimum recording is significantly greater for all those Examples (1 through 11) containing Dye IV or Dye V, both individually present or in combination.

Optical Absorbance Measurement

The optical absorbance of the dye layer was measured in the wavelength range 700–830 nm using a Perkin Elmer lambda 18 spectrophotometer. The absorbance at the peak of the dye absorption band (680–730 nm) and the absorbance in the range 775–830 nm was recorded.

Photostability Measurement

Samples cut from the dye-coated polycarbonate disc were placed in a light exposure unit comprising two closely spaced florescent tubes, having a spectrum with enhanced emission in the spectral range 550–750 nm corresponding to the absorption band of the dye layer. The samples were held in close proximity to the tubes and received an exposure of about 10,000 lux intensity for a period of 48 hours. The optical density change was recorded.

Recording Power Measurements

A second dye-coated polycarbonate disc substrate was prepared using the same dye mixture and under the same conditions as previously described.

A light reflecting layer comprising a gold film of 60 nm thickness was formed on the light absorbing layer by vacuum deposition in a sputtering chamber. A protective layer comprising a photopolymer lacquer was deposited by spin coating onto the gold layer and cured by means of ultra-violet radiation.

The fabricated sample disc was tested to measure the laser recording power for optimum recording by the method described in Appendix B-3 of the Philips-Sony Orange Book using an APEX model Recordable CD test instrument. The output is measured in milliwatts (mW)

TABLE 2

| | Composition | | | | | | | |
|---|---|---|---|---|---|---|---|---|
| | Dye A | | Dye B | | Dye C | | Ni Stabilizer | |
| Example | No. | conc. | No. | conc. | No. | conc. | No. | conc. |
| 1 | IIIA | 80 | IV | 20 | | | | |
| 2 | IIIA | 75 | IV | 25 | | | | |
| 3 | IIIA | 80 | V | 20 | | | | |
| 4 | IIIA | 80 | V | 10 | IV | 10 | | |
| 5 | IIIA | 80 | V | 10 | | | VI | 10 |
| 6 | IIIA | 80 | IV | 10 | | | VI | 10 |
| 7 | IIIA | 65 | V | 35 | | | | |
| 8 | IIIA | 60 | IV | 20 | I | 20 | | |
| 9 | II | 40 | IV | 20 | I | 40 | | |
| 10 | IIIA | 90 | IV | 10 | | | | |
| 11 | IIIB | 90 | IV | 10 | | | | |
| COMPARATIVE EXAMPLES | | | | | | | | |
| C1 | IIIA | 100 | | | | | | |
| C2 | II | 65 | | | I | 35 | | |

TABLE 3

| | Film Absorbance Wavelength (nm) | | | | % Change Wavelength (nm) | | | Recording Power | Photostability |
|---|---|---|---|---|---|---|---|---|---|
| Example | 775 | 790 | 800 | 830 | 775–790 | 800–830 | 775–830 | (mW) | % Absorbance Change over 48 hours |
| 1 | 0.195 | 0.180 | 0.170 | 0.160 | 8 | 6 | 18 | 5.9 | 8 |
| 2 | 0.190 | 0.180 | 0.170 | 0.160 | 8 | 6 | 18 | 5.8 | |
| 3 | 0.185 | 0.175 | 0.170 | 0.160 | 6 | 6 | 14 | 6.0 | 8 |
| 4 | 0.190 | 0.180 | 0.175 | 0.170 | 6 | 4 | 11 | | 7 |
| 5 | 0.220 | 0.215 | 0.210 | 0.200 | 2 | 5 | 9 | | 7 |
| 6 | 0.230 | 0.220 | 0.210 | 0.200 | 5 | 5 | 13 | | 7 |
| 7 | 0.185 | 0.185 | 0.185 | 0.190 | 0 | −3 | −3 | 6.1 | |
| 8 | 0.155 | 0.150 | 0.145 | 0.135 | 3 | 7 | 13 | | 7 |
| 9 | 0.260 | 0.240 | 0.230 | 0.200 | 9 | 15 | 23 | | 6 |
| 10 | 0.215 | 0.190 | 0.190 | 0.160 | 13 | 13 | 26 | 6.4 | 12 |
| 11 | 0.160 | 0.145 | 0.140 | 0.130 | 10 | 8 | 19 | | 9 |
| COMPARATIVE EXAMPLES | | | | | | | | | |
| C1 | 0.170 | 0.130 | 0.120 | 0.080 | 31 | 50 | 53 | 11.5 | 58 |
| C2 | 0.230 | 0.170 | 0.150 | 0.110 | 35 | 36 | 52 | 10.5 | 67 |

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A dye composition for use in CD-R recording media and having reduced wavelength dependence of the dye layer absorption, comprising:
   (1) a first cyanine dye having a peak absorption wavelength in the solid film form in the range of about 690 nm to about 730 nm, the amount of said first cyanine dye is about 90% to about 30% by weight, based on the total weight of the solid components in said dye composition; and
   (2) at least one organic noncyanine dye having a peak absorption wavelength in the range of about 900 nm to about 1200 nm, each noncyanine dye having an absorption coefficient greater than 30,000 cm$^{-1}$ and said amount of noncyanine dye is about 10% to about 40% by weight, based on the total weight of the solid components in said dye composition.

2. The dye composition of claim 1, wherein said first cyanine dye has formula (III):

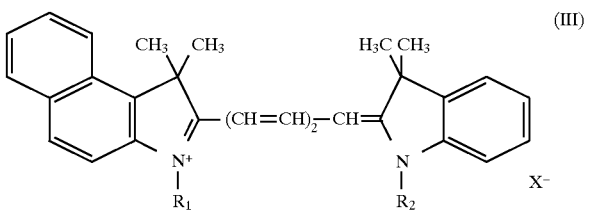

wherein
   $X^-$ is selected from the group consisting of $ClO_4^-$, $IO_3^-$ and $I^-$;
   $R_1$ is butyl and $R_2$ is propyl.

3. The dye composition of claim 1, wherein said first cyanine dye has formula (II):

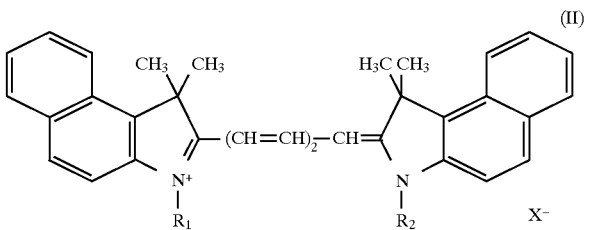

wherein
   $X^-$ is selected from the group consisting of $ClO_4^-$, $IO_3^-$ and $I^-$;
   $R_1$ and $R_2$ are both butyl.

4. The dye composition of claim 1, wherein said noncyanine dye has formula (IV):

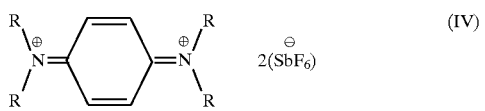

where R =

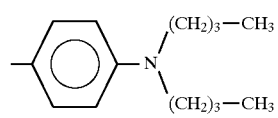

5. The dye composition of claim 1, wherein said noncyanine dye has formula (V).

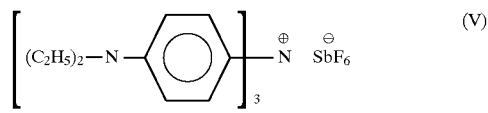

6. The dye composition of claim 1, wherein said first cyanine dye is present in said dye composition in an amount from about 60% to about 85% by weight, based on the total weight of the solid components in said dye composition.

7. The dye composition of claim 1, wherein said noncyanine dye is present in said composition in the amount of about 10% to about 35% by weight, based on the total weight of the solid components in said dye composition.

8. The dye composition of claim 1, wherein said first cyanine dye has a peak absorption wavelength in the solid film form in the range from about 695 nm to about 715 nm and is present in an amount from about 85% to about 60% by weight, based on the total weight of the solid components in said dye composition.

9. The dye composition of claim 1, wherein said noncyanine dye has a peak absorption wavelength in the range from about 950 nm and 1175 nm.

10. The dye composition of claim 1, further comprising
    (3) a second cyanine dye having a peak absorption wavelength in the solid film form in the range from 660 nm to 700 nm, the amount of said second cyanine dye, if present, is from about 5% to about 55% by weight, based on the total weight of the solid components in said dye composition.

11. The dye composition of claim 10, wherein said second cyanine has formula (I):

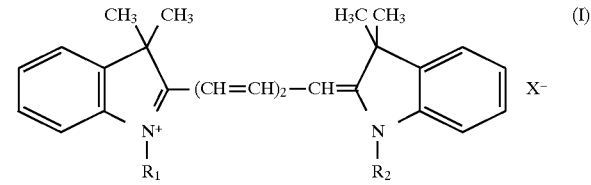

wherein
   $X^-$ is selected from the group consisting of $ClO_4^-$, $IO_3^-$ and $I^-$; and
   both $R_1$ and $R_2$ are propyl.

12. The dye composition of claim 10, wherein the amount of said second cyanine dye is from about 5% to about 25% by weight, based on the total weight of the solid components in said dye composition.

13. The dye composition of claim 1, further comprising a nickel stabilizer, the amount of said nickel stabilizer present in an amount from about 1% to about 25% by weight of the solid components in said dye composition.

14. The dye composition of claim 13, wherein said nickel stabilizer is nickel dibutyl dithiocarbamate.

15. The dye composition of claim 1, wherein said first cyanine dye is asymmetrical.

16. The dye composition of claim 1, wherein said first cyanine dye includes an anion selected from the group consisting of $ClO_4^-$, $IO_3^-$ and $I^-$.

17. The dye composition of claim 10, wherein said second cyanine dye includes an anion selected from the group consisting of $ClO_4^-$, $IO_3^-$ and $I^-$.

18. A recordable medium, comprising:
   (a) a protective layer;

(b) a reflective layer in proximity to said protective layer;

(c) a recording layer in proximity to said reflective layer and forming an optical interface with said reflective layer, said recording layer comprising a dye composition of claim 1; and (d) a transparent substrate on which said recording layer is formed.

19. A recording system, comprising the recordable medium of claim 18.

\* \* \* \* \*